United States Patent [19]
Wimmer

[11] Patent Number: 6,099,941
[45] Date of Patent: Aug. 8, 2000

[54] LAMINATE COMPONENT HAVING DIFFERENT ELASTICITY IN THE EDGE REGIONS

[75] Inventor: Wolfgang Wimmer, Vienna, Austria

[73] Assignee: Isovolta Österreichische Isolierstoffwerke Aktiengesellschaft Industriezentrum NÖ-Süd, Wiener Neudorf, Austria

[21] Appl. No.: 08/696,842

[22] PCT Filed: Jan. 19, 1996

[86] PCT No.: PCT/AT96/00007

§ 371 Date: Aug. 28, 1996

§ 102(e) Date: Aug. 28, 1996

[87] PCT Pub. No.: WO96/22188

PCT Pub. Date: Jul. 25, 1996

[30] Foreign Application Priority Data

Jan. 19, 1995 [AT] Austria .......................................... 80/95

[51] Int. Cl.[7] ..................................................... B32B 23/02
[52] U.S. Cl. .......................... 428/192; 428/107; 428/110; 428/113; 428/172; 428/156; 428/221; 428/295.1; 428/339

[58] Field of Search ...................................... 428/339, 110, 428/221, 192, 295.1, 172, 493, 423.1, 482, 311.5, 425.3, 107, 113, 156; 156/62.2, 288, 163; 427/180, 393.5; 264/257, 152

[56] References Cited

U.S. PATENT DOCUMENTS

| 3,641,230 | 2/1972 | Jenks | 264/152 |
| 3,736,609 | 6/1973 | Saucier | 9/310 |
| 4,316,934 | 2/1982 | Maier et al. | 428/319.3 |
| 4,726,996 | 2/1988 | Le Gae et al. | 428/425.3 |

*Primary Examiner*—Deborah Jones
*Assistant Examiner*—Abraham Bahta
*Attorney, Agent, or Firm*—Bacon & Thomas

[57] ABSTRACT

The description relates to a laminate component consisting essentially of a highly elastic fibre-reinforced synthetic resin matrix which contains a) a laminate region with a bending E modulus of 10,000 to 40,000 MPa which can be made from several synthetic resin fibre prepregs hot-pressed together and thus hardened, b) connecting strips arranged on at least two opposite edges of the laminate region of soft elastic material which are bonded at the surface with the corresponding edges of the laminate region, and c) a decorative covering layer on one side of the laminate.

6 Claims, 1 Drawing Sheet

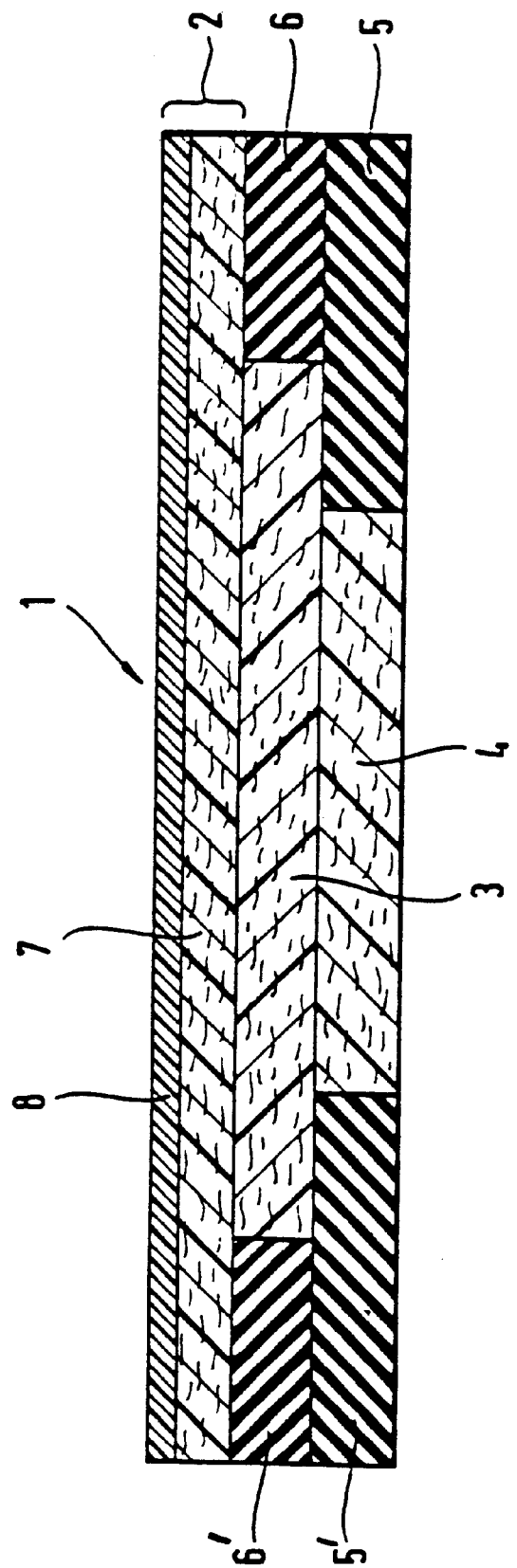

LAMINATE COMPONENT HAVING DIFFERENT ELASTICITY IN THE EDGE REGIONS

The invention relates to a laminate component comprised essentially of a synthetic resin matrix that is reinforced with highly elastic fibers.

BACKGROUND OF THE INVENTION

Laminates of this type are produced by pressing together a number of prepregs that are produced by impregnating reinforcement fibers with appropriate synthetic resins. These laminates may be used, for example, to produce components for use in vehicle interiors or in the machine-building industry. Laminates of this type must now meet a long list of performance requirements, such as good dynamic, mechanical properties and high levels of resistance to heat and chemicals. Furthermore, such laminates must meet particularly high flame-resistance requirements if they are to be used in components for vehicle interiors.

Although the laminates described at the beginning of this document possess good dynamic, mechanical properties, experience has shown that when these laminates are subjected to subsequent processing, stress points can develop, particularly at the edges, seriously interfering with the continued use of these laminates, especially with their being permanently affixed as building components.

It is thus the purpose of the invention to produce a laminate component with a different elasticity across its surface, such that the edges possess a sufficiently high degree of elasticity to enable them to be mounted without problems, while the degree of elasticity manifested at the center of the component can ensure sufficient mechanical stability of the laminate component.

SUMMARY OF THE INVENTION

This objective is achieved with the laminate component specified in the invention, which is comprised essentially of a synthetic resin matrix, reinforced with highly elastic fibers, and which contains: a) a laminate region having a bending E modulus of 10,000 to 40,000 Mpa, which can be produced from several synthetic fiber prepregs, hot-pressed together, and thus, hardened; b) connecting strips made of soft elastic materials that are arranged on at least two opposite edges of the laminate region and are bonded at the surface with the corresponding edges of the laminate region; and c) a decorative covering layer on one side of the laminate.

The laminate component specified in the invention also provides the advantage that the edge of the laminate is stepped down to the connecting strips.

A further advantage of the flexible laminate component specified in the invention is that the soft elastic material of the edge regions is made of flame-retardant rubber that can be inserted in a non-cross-linked stage during the production of the laminate component. The material is then cross-linked with the hot-pressing of the synthetic resin fiber prepregs, consequently bonding the soft elastic material to the component.

The laminate component specified in the invention further contains a synthetic resin matrix made of a duromeric synthetic resin (preferably a phenolic resin) and contains fiberglass as the highly-elastic fibers.

Another advantage of the invention is that the synthetic resin of the matrix is modified such that the laminate component possesses improved flame-resistance.

BRIEF DESCRIPTION OF THE DRAWING

FIG. 1 is a cross-section of laminate component of the invention.

DETAILED DESCRIPTION OF THE INVENTION

Below, the invention will be specified in greater detail by means of a description of the diagram along with an example.

The diagram provides an illustration of the laminate component 1. This shows the laminate regions 3 and 4, as well as the connecting strips 5 and 5', and 6 and 6', that lie on opposite edges of this laminate region. The decorative covering layer 2, comprising of a thin laminate layer 7 and a polyvinyl fluoride layer 8, is shown on at least one side of the laminate.

The laminate component specified in the invention, as illustrated in the diagram, may be produced via the following process steps:

Step 1:

The highly-elastic fibers may, for example, be embedded in the form of fiberglass, which are subsequently impregnated with a phenolic resin solution using a dipping impregnation process. The goal here is to produce a resin content of 25 to 60 percent, preferably 35 to 50 percent. The impregnated fiberglass is then heat treated, causing the applied solvent to be removed via evaporation and the synthetic resin to be transferred to the B-stage. In this step, synthetic resin fiber prepregs are prepared.

Step 2:

The synthetic resin fiber prepregs produced in Step 1 are now cut into several layers to form the central laminate region 3, 4, which is formed in a graduated manner towards its edges as illustrated in the diagram.

Step 3:

The layers of fiber prepregs having been cut according to Step 2 are assembled on at least two sides with non-cross-linked soft elastic materials such as flame-retardant rubber or polyurethane films. These soft elastic materials may contain flame- and/or smoke-retardant conditioners. In order to form a connecting strip to the central laminate region 3, the layers of soft elastic material 6, 6' are 3 cm wide, for example, while the layers 5, 5', in order to form a connection to the edge region of the laminate 4, are 5 cm wide. The outer side of this staple is further assembled with a covering layer 2, which may be comprised of a printed polyvinyl fluoride film 8 and a thin laminate layer 7.

Step 4:

The staple formed in Step 3 is then pressed, using a well-known pressing process, at a temperature of up to 140° C. and a pressure level of 10 bar. The soft elastic material of the connecting strips 5, 5' and 6, 6' is thus cross-linked, while the resin in the laminate region 3, 4, which is in the B-stage, as well as the fiber prepreg 7 which may have been embedded in the covering layer 2, is transferred to the C-stage.

The laminate component specified in the invention may be used in constructing vehicle interiors. As a result of the employment of the flame-resistant, modified synthetic resin of the synthetic resin matrix and the flame-retardant, soft elastic material on the edges, it shows improved flame- and/or smoke resistance when compared to presently-known laminates.

What is claimed is:

1. Laminate component comprised of a synthetic resin matrix, reinforced with fibers, and containing a laminate region having a bending E modulus of 10,000 to 40,000 Mpa, which is produced from a plurality of synthetic resin fiber prepregs, hot-pressed together, and thereby hardened;

connecting strips arranged on at least two opposite edges of the laminate region and in a graduated manner towards the laminate region, said strips being made of soft elastic materials comprised of flame retardant rubber and being bonded to the corresponding edges of the laminate region; and a decorative covering layer covering one side of the laminate.

2. Laminate component in accordance with claim 1, wherein in the production of the laminate component, the soft elastic material is applied in a non-cross-linked stage and is bonded to the edges of the laminate region by hot-pressing the synthetic resin fiber prepregs causing simultaneous cross-linking.

3. Laminate component in accordance with claim 1, wherein the synthetic resin matrix is formed from a duromeric synthetic resin.

4. Laminate component in accordance with claim 1, wherein the highly-elastic fibers are glass fibers.

5. Laminate component in accordance with claim 3, wherein the synthetic resin matrix is formed from a phenolic resin.

6. Laminate component in accordance with claim 1, wherein said decorative covering layer is comprised of a laminate layer and a printed polyvinyl fluoride layer.

* * * * *